(12) United States Patent
Takada et al.

(10) Patent No.: US 6,607,801 B2
(45) Date of Patent: Aug. 19, 2003

(54) HEAT-SENSITIVE ADHESIVE SHEET AND INFORMATION-RECORDED SHEET MATERIAL USING THE SAME

(75) Inventors: Toshihiko Takada, Saitama-ken (JP); Kazuo Nagashima, Saitama-ken (JP); Norio Yabe, Saitama-ken (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 1 day.

(21) Appl. No.: 09/731,748

(22) Filed: Dec. 8, 2000

(65) Prior Publication Data

US 2001/0003609 A1 Jun. 14, 2001

(30) Foreign Application Priority Data

Dec. 8, 1999 (JP) .......................................... 11-349187

(51) Int. Cl.⁷ .................................................. B32B 9/00
(52) U.S. Cl. .................... 428/40.1; 428/40.7; 428/41.3; 428/41.4; 428/41.5; 428/41.8; 428/346; 428/349
(58) Field of Search .............................. 428/40.1, 40.7, 428/41.3, 41.4, 41.5, 41.8, 346, 349

(56) References Cited

U.S. PATENT DOCUMENTS

| | | |
|---|---|---|
| 5,281,474 A | 1/1994 | Matsuzaki et al. |
| 5,399,414 A | 3/1995 | Matsuzaki et al. |
| 6,287,661 B1 * | 9/2001 | Shigetomi .................. 428/64.7 |

OTHER PUBLICATIONS

PAJ—Pub. No. 10265745, Oct. 6, 1998, Inventor: Matsuzaki Morio, Title: Heat–Sensitive Adhesive Sheet and Information Recording Unit Using the Same.
PAJ—Pub. No. 08100158, Apr. 16, 1996, Inventor: Sato Tadashi, Title: Double Coated Adhesive Tape and Card Using the Same Tape.
PAJ—Pub. No. 07017166, Jan. 20, 1995, Inventor: Hado Nobuhiro, Title: Heat–Sensitive Laminated Sheet and Information Recording Body with the Same.

* cited by examiner

*Primary Examiner*—Nasser Ahmad
(74) *Attorney, Agent, or Firm*—Millen, White, Zelano & Branigan, P.C.

(57) ABSTRACT

A double-sided heat-sensitive adhesive sheet comprises a support provided with a release layer on one side thereof and heat-sensitive adhesive layers which are formed on both sides of the support and have sufficient adhesion to the support but can be easily peeled apart from the release layer, wherein the release layer and the heat-sensitive adhesive layer has at their interface a 180° peeling resistance of 10–30 g/50 mm in a peel test performed at a peeling speed of 500 mm/min. in an atmosphere of 20° C. and 65% RH.

The adhesive sheet is interposed between each opposed pair of information-recorded faces of recording material having on one side at least two spaces for information-recording, and heat is applied to the resultant assembly to make a laminate. The laminate can have a size and weight suitable for mailing as a postcard, and can bear confidential information on the inside and be peeled apart when desired.

16 Claims, 1 Drawing Sheet

HEAT-SENSITIVE ADHESIVE SHEET AND INFORMATION-RECORDED SHEET MATERIAL USING THE SAME

FIELD OF THE INVENTION

The present invention relates to a heat-sensitive adhesive sheet which can bond opposed information-recorded faces provided by one or two sheets of recording material together by application of heat to form a laminated information-recorded material which can be peeled apart when desired. The laminated information-recorded material thus formed can be utilized as, e.g., notices, cards and postcards in which information to be concealed from view is recorded. In particular, the invention is concerned with a heat-sensitive adhesive sheet and a laminated information-recorded material utilizing such a sheet, which can take the form of a mailable card and enables communication of more information than a conventional postcard at the same postage.

BACKGROUND OF THE INVENTION

Hitherto, notices and direct mails concerning personal information, such as notices for payment, receipts and notices of expiration, have been mailed in the form of sealed letter from the Social Insurance Agency, banks, brokerage firms, post offices, electric power companies, and so on. However, the drawback to mailing a document by a sealed letter is its high price, compared with sending it as a postcard. Therefore, mailing large quantities of sealed letters obliges an immense expense on the sender part.

For the purpose of remove such a drawback, various postcards capable of safeguarding the secrecy of the contents, the so-called confidential postcards, have so far been proposed and put to practical use. Such postcards are made, e.g., by opposing textual or/and pictorial information-recorded faces of two sheets of recording material via a heat-sensitive adhesive sheet and subjecting them to pseudo adhesion by application of heat thereto. The amount of information communicated to a receiver by the thus made confidential postcard can be increased to the same level as that by a sealed letter. And the secrecy of the information recorded inside such a postcard can be kept till a receiver peels apart either sheet of recording material and reads the information recorded on the inside.

As a more specific example of those proposals, mention may be made of a lettercard having on one side of a paper support a heat-sensitive adhesive layer on which information can be recorded (Japanese Jikkai Hei 1-148371, wherein the term "Jikkai" means an "unexamined published utility model application"). Such a lettercard has a postcard size when it is folded in two, and the opposed faces of the folded heat-sensitive layer are pressed under heating so as to adhere to each other in a condition that the adhesion strength between them secures peel-apart capability. However, this lettercard has a defect that the information recorded on one face is liable to be transferred onto the other face because the recorded face is the surface of the heat-sensitive layer to be peeled part. Further, it has a drawback of difficulty in controlling the adhesion strength of the heat-sensitive adhesive layer. So it frequently occurs that the lettercard curls by delamination to make it hard to read the contents.

As another example has been proposed a heat-sensitive adhesive sheet enabling pseudo adhesion between information-recorded faces of two sheets of recording material and an information-recorded sheet material formed by interposing such an adhesive sheet between information-recorded faces of two sheets of postcard-size recording material and subjecting them to pseudo adhesion by application of heat thereto (Japanese Tokkai Hei 4-126298, wherein the term "Tokkai" as used means an "unexamined published patent application"). Such a heat-adhesive sheet has a four-layer structure that a synthetic resin coating (as heat-sensitive layer), a support, a thermoplastic resin coating (as release layer) and a synthetic resin coating (as heat-sensitive layer) are arranged in the order of mention. So the information-recorded sheet material using the foregoing heat-adhesive sheet can be peeled apart at the interface between the support and the thermoplastic resin layer. However, such an information-recorded sheet material has a defect that, when heat is applied to two information-recorded sheets between which the adhesive sheet is interposed, the resin coatings of the adhesive sheet melt and extrude from the cut end thereof; as a result, the adhesive sheet is bordered with those resins to make it hard to open the seal.

Such a defect is remedied by the confidential postcard disclosed in Japanese Tokkai Hei 7-17166. This postcard utilizes a heat-sensitive adhesive sheet having the same four-layer structure as mentioned above. Therein, the thermoplastic resin layer provided on one side of a support has a specified Vicat softening temperature so as to ensure easy peel-apart capability but prevent spontaneous delamination. And the heat-sensitive adhesive layers provided on the other side of the support and on the thermoplastic resin layer respectively have a specified glass transition or Vicat softening temperature. Further, the 180° peeling resistance at the interface between the support and the thermoplastic resin layer is adjusted to a specified range.

Under recent circumstances that various kinds of paper sheets, particularly paper sheets having weak surface strength, have been used in making confidential postcards for sending bills, detailed statements, direct mails and so on, it has turned out that even the foregoing heat-sensitive adhesive sheet gave rise to defects at the time of opening the seal. This is because the adhesive sheet causes slight extrusion of resin coatings from the cut end at the time of adhesion, or low peeling resistance cannot consistently be ensured therein.

SUMMARY OF THE INVENTION

Therefore, a first object of the invention is to provide a double-sided heat-sensitive adhesive sheet for forming an information-recorded sheet material, especially useful for a confidential postcard, which can be opened without damaging the information recorded on the inside even when recording materials having weak surface strength are employed.

A second object of the invention is to provide an information-recorded sheet material which causes no defects when the seal is open although it uses recording sheets having weak surface strength.

The aforementioned objects are attained with a double-sided heat-sensitive adhesive sheet, which comprises a support provided with a release layer on one side thereof and heat-sensitive adhesive layers which are formed on both sides of the support and have sufficient adhesion to the support but can be easily peeled apart from the release layer, wherein the release layer and the heat-sensitive adhesive layer has at their interface a 180° peeling resistance of 10–30 g/50 mm in a peel test performed at a peeling speed of 500 mm/min. in an atmosphere of 20° C. and 65% RH, and an information-recorded sheet material formed by interposing the foregoing heat-sensitive adhesive sheet between each opposed pair of information-recorded faces of recording material having at least two information-recorded faces on one side and integrating them into a laminate by application of heat thereto.

In other words, confidential postcards prepared using the present double-sided heat-sensitive adhesive sheets have a special advantage in that they are significantly improved in seal opening rate, regardless of nature of paper supports used therein.

Figure 1:
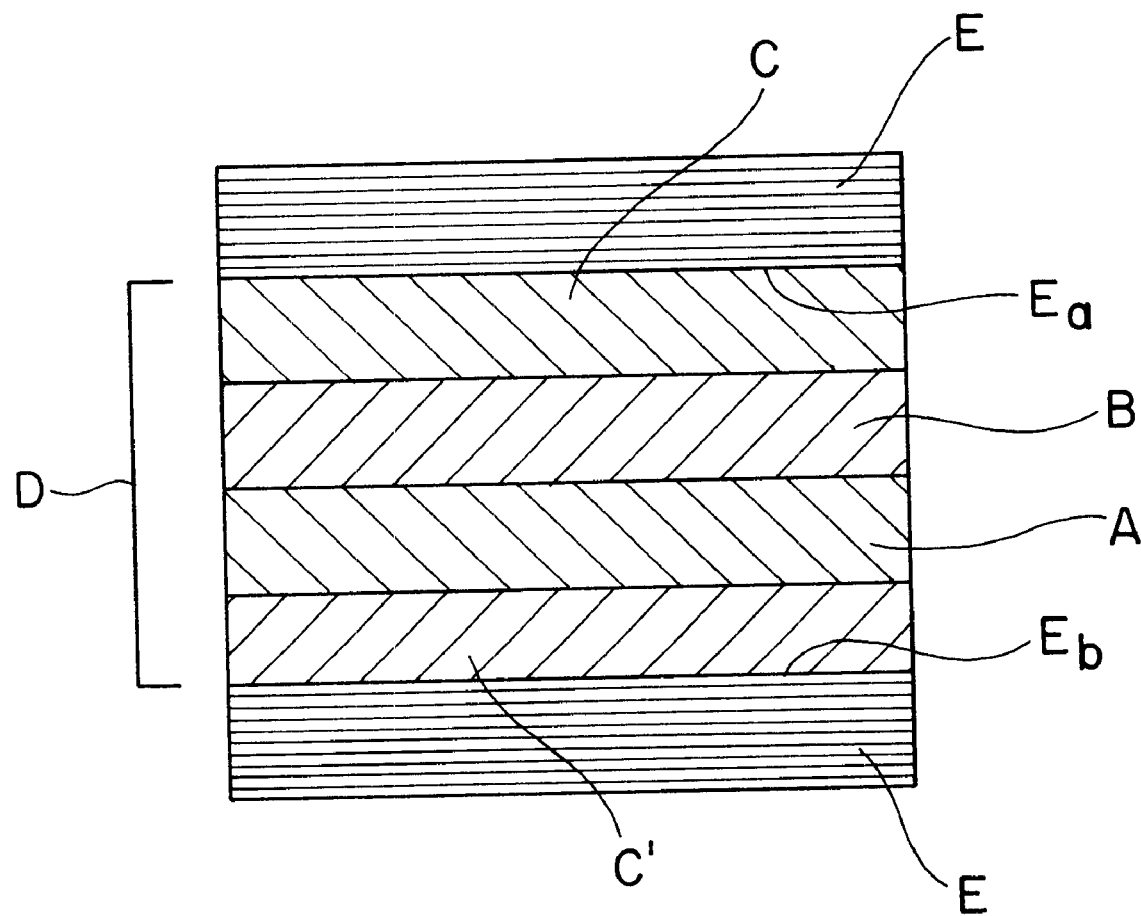
FIG. 1 shows a cross-sectional view of an information-recorded sheet material prepared in accordance with the invention, wherein a double-sided heat-sensitive adhesive sheet according to the invention is incorporated.

In the FIGURE, the reference symbol A represents a support, B a release layer, C a heat-sensitive adhesive layer, C' a heat-sensitive adhesive layer, D a heat-sensitive adhesive sheet, E a recording material, Ea an information-recorded face, and Eb an information-recorded face.

DETAILED DESCRIPTION OF THE INVENTION

Some embodiments of the invention will now be described in detail.

Examples of a support usable in the invention include plastic films such as polyethylene terephthalate, polypropylene, polyethylene, polyvinyl chloride, polystyrene, polycarbonate and triacetate films, and paper sheets such as impregnated paper and glassine paper. Of these supports, polyethylene terephthalate film is preferred in particular from the viewpoints of heat resistance, dimensional stability and cost. The support used in the invention has no particular restriction as to its thickness, but the suitable thickness thereof is from 12 to 150 μm.

The release layer used in the present double-sided heat-sensitive adhesive sheet is required to have not only sufficient adhesion to a support but also at the interface with a heat-sensitive adhesive layer formed thereon a 180° peeling resistance of 10–30 g/50 mm in a peel test performed at a peeling speed of 500 mm/min. in an atmosphere of 20° C. and 65% RH (according to JIS Z-0237). When the peeling resistance is below 10 g/50 mm, spontaneous delamination may occur and thereby the sealed confidential postcard may open in the course of mailing. When the peeling resistance is increased beyond 30 g/50 mm, on the other hand, the information-recorded face of a recording material is exfoliated at the time of opening the seal when the recording material has a weak surface strength, and thereby the information therein becomes illegible.

Suitable film-forming high molecular resins used for the release layer as mentioned above are thermosetting resins, with examples including urethane resin, melamine resin, fluorocarbon resin, silicone resin, polyester resin, polyolefin resin and mixtures of two or more thereof. The suitable thickness of release layer coated is from 1 to 10 μm, preferably from 1 to 5 μm.

Each of heat-sensitive adhesive layers as constituents of the present heat-sensitive adhesive sheet is preferably formed using at least one resin selected from the group consisting of ethylene/vinyl acetate copolymer resin, polyester resin, ethylene/acrylic acid copolymer resin and ethylene/ethyl acrylate copolymer resin. Further, it is advantageous to let the heat-sensitive adhesive layer have a matted surface by the addition of a pigment thereto. There are two reasons for this. First, the matted surface of the adhesive layer can prevent the molten resin from bulging out from between the recording materials at the time when the present information-recorded sheet material is made by interposing the present double-sided heat-sensitive adhesive sheet between recording materials and bonding them together by applying heat thereto. Second, the matted surface of the adhesive layer can prevent the present adhesive sheet from causing blocking trouble when the adhesive sheet is formed into a roll sheet at the stage of production. The suitable amount of pigment added is below 20 weight %, preferably from 3 to 15 weight %.

The recording materials used for the present information-recorded sheet material can be chosen arbitrarily from known materials, including not only paper sheets generally used for postcards and sheets for printing computer output but also paper sheets having weak surface strength. The effects of the present invention are noticeable especially when paper sheets having surface strength of Dennison Wax No. 10 or below are used as recording materials.

A preferred embodiment of the present information-recorded sheet material is a postcard-size material made by interposing the present double-sided heat-sensitive adhesive sheet between an opposed information-recorded faces of one or two sheets of recording material and integrating them into a laminate through thermal bonding.

More specifically, as shown in FIG. 1, two postcard-size recording sheets are arranged so as to oppose the information recorded faces thereof, the present double-sided heat-sensitive adhesive sheet is interposed between them, and then they are integrated into a laminate by thermal bonding. Therein, as one of those recording sheets can also be used a computer-output printing sheet having three faces printed at the same time. This sheet is folded in S-form or Z-form and a pair of printed faces opposed to each other are thermally bonded together via the present adhesive sheet. In this case, the postcard obtained can have four information-recorded faces on the inside thereof, and so it enables a great amount of information to be communicated. Of course, the present information-recorded sheet material can be used as an information-recorded material for mailing as a sealed letter as well as a confidential postcard.

Now, the present invention will be illustrated in greater detail by reference to the following examples. However, these examples should not be construed as limiting the scope of the invention in any way. Additionally, all "parts" in Examples are by weight unless otherwise noted.

EXAMPLE 1

| Release Layer Forming Solution: | |
|---|---|
| Acrylamide copolymer (Tesfine 322, trade name, produced by Hitachi Chemical Polymer Co., Ltd.) | 0.6 parts |
| Synthetic acrylic resin (TA-32-204C, trade name, produced by Hitachi Chemical Polymer Co., Ltd.) | 9.5 parts |
| Paratoluenesulfonic acid (Drier 900, trade name, produced by Hitachi Chemical Polymer Co., Ltd.) | 0.1 parts |
| Toluene | 40.4 parts |
| Methyl ethyl ketone | 40.4 parts |
| Cyclohexanone | 9.0 parts |
| Heat-sensitive Adhesive Layer Forming Solution: | |
| Vinyl acetate copolymer (Mowinyl 081F, trade name, produced by Hoechst Gosei Co., Ltd.) | 60.6 parts |

-continued

| | |
|---|---|
| Silica (Sylysia 445, trade name, produced by Fuji Silysia Chemical Co., Ltd.) | 1.0 parts |
| Water | 19.2 parts |
| Methanol | 19.2 parts |

On one side of a 16 μm-thick polyethylene terephthalate film as a plastic film support, the foregoing release layer forming solution was coated with a roll coater, and then dried at 140° C. for 1 minute to form a release layer having a thickness of about 1 μm. On the other side of the polyethylene terephthalate film, the foregoing heat-sensitive adhesive layer forming solution was coated with a roll coater, and then dried at 90° C. for 1 minute to form a heat-sensitive adhesive layer having a thickness of about 5 μm. Further, the same heat-sensitive adhesive layer forming solution as used above was coated on the release layer, and then dried to form a heat-sensitive adhesive layer having a thickness of about 5 μm. Thus, a double-sided heat-sensitive adhesive sheet according to the invention was prepared.

Then, the following four kinds of coated paper different in basis weight and surface strength (the measurement of surface strength was made according to JIS-P8129) were adopted as recording material samples. On one side of each coated paper, a postal code frame, a postal code and an address were printed with UV ink (UV curable ink).

| Recording Material Sample | Basis Weight | Surface Strength |
|---|---|---|
| Coated paper (1) | 70 g/m² | Dennison Wax No. 12 |
| Coated paper (2) | 125 g/m² | Dennison Wax No. 10 |
| Coated paper (3) | 135 g/m² | Dennison Wax No. 10 |
| Coated paper (4) | 135 g/m² | Dennison Wax No. 6 |

Then, information to be communicated was printed on two spaces of the other side of each recording material sample. The thus information-printed samples were each folded in two so that the information-printed spaces were faced to each other. And the heat-sensitive adhesive sheet prepared in advance was interposed between each pair of folded spaces. Further, each assembly thus obtained was passed between two rolls adjusted so as to have a surface temperature of 140° C. to undergo pseudo adhesion, thereby making four kinds of confidential postcards. These operations for information-printed samples were carried out using a machine capable of continuously making confidential postcards, Jemits Machine (produced by Dupro Seiko Co., Ltd.).

Each of the confidential postcards thus made was easy to open at the interface between the release layer and the heat-sensitive adhesive layer, but it caused no spontaneous delamination. Further, it gave rise to no transfer of the information recorded on one face onto the other face, so the information recorded on the inside thereof was clearly legible. The 180° peeling resistance value of each of these confidential postcards at the interface between the release layer and the heat-sensitive adhesive layer was measured at a peeling speed of 500 mm/min. in an atmosphere of 20° C. and 65% RH. The measurement values obtained were within the range of 10 to 20 g/50 mm.

On the other hand, the heat-sensitive adhesive sheet prepared in the foregoing manner was wound into a roll, and stored for one month in an atmosphere of 40° C., but no blocking occurred therein. As a result, it was confirmed that the present heat-sensitive adhesive sheet had excellent long-term storage stability.

Additionally, it was also confirmed that the confidential postcards made herein had their respective total weights within the range standardized by the postal laws, so they were mailable as postcard.

EXAMPLE 2

Confidential postcard samples were made in the same manner as in Example 1, except that the release layer forming solution was changed to the following.

| Release Layer Forming Solution: | |
|---|---|
| Acrylamide copolymer (Tesfine 322, trade name, produced by Hitachi Chemical Polymer Co., Ltd.) | 0.6 parts |
| Synthetic melamine resin (SP Thermodic B, trade name, produced by Dai-Nippon Ink & Chemicals Inc.) | 30.2 parts |
| Paratoluenesulfonic acid (Drier 900, trade name, produced by Hitachi Chemical Polymer Co., Ltd.) | 0.1 parts |
| Toluene | 31.1 parts |
| Methyl ethyl ketone | 31.1 parts |
| Cyclohexanone | 6.9 parts |

The thus made samples were each examined for 180° peeling resistance at a peeling speed of 500 mm/min. in an atmosphere of 20° C. and 65% RH, and all the measurement values in this examination were within the range of 20 to 30 g/50 mm. The other properties of these samples were the same as those of the confidential postcard samples made in Example 1.

EXAMPLE 3

Confidential postcard samples were made in the same manner as in Example 1, except that the heat-sensitive adhesive layer forming solution was changed to the following.

| Heat-sensitive Adhesive Layer Forming Solution: | |
|---|---|
| Vinyl acetate copolymer (Mowinyl 081F, trade name, produced by Hoechst Gosei Co., Ltd.) | 37.7 parts |
| Ethylene/vinyl acetate copolymer (EC-1200, trade name, produced by Chuo Rika Kogyo K.K.) | 18.7 parts |
| Silica (Sylysia 445, trade name, produced by Fuji Silysia Chemical Co., Ltd.) | 1.2 parts |
| Water | 21.2 parts |
| Methanol | 21.2 parts |

The thus made samples were each examined for 180° peeling resistance at a peeling speed of 500 mm/min. in an atmosphere of 20° C. and 65% RH, and all the measurement values in this examination were within the range of 20 to 30 g/50 mm. The other properties of these samples were the same as those of the confidential postcard samples made in Example 1.

COMPARATIVE EXAMPLE 1

A heat-sensitive adhesive sheet was prepared in the same manner as in Example 1, except that the release layer was replaced by a thermoplastic resin layer formed in a thickness of 10 μm using a thermoplastic elastomer having a Vicat softening temperature of 55° C. Then, this adhesive sheet and each of the recording material samples employed in Example 1 were bonded together in the same manner as in Example 1, thereby making confidential postcard samples. In opening the seal of the thus made samples each, each sample was peeled apart at the interface between the support and the release layer, in contrast to the samples prepared in Examples 1 to 3. The 180° peeling resistance between the support and the release layer was measured at a peeling speed of 500 mm/min. in an atmosphere of 20° C. and 65% RH. All the measurement values in this examination were within the range of 40 to 60 g/50 mm. As to the seal-opening tests, a good result was obtained in the case of the postcard using the coated paper (1), but opening failures occurred occasionally in the postcards using the coated paper (2) and (3) respectively. On the other hand, in the case of the postcard using the coated paper (4) having the lowest surface strength, opening failures occurred quite frequently to result in exfoliation of the surface coating of the coated paper.

COMPARATIVE EXAMPLE 2

A heat-sensitive adhesive sheet was prepared in the same manner as in Example 1, except that the release layer was replaced by a thermoplastic resin layer formed in a thickness of 5 μm using an ionomer resin. Then, this adhesive sheet and each of the recording material samples employed in Example 1 were bonded together in the same manner as in Example 1, thereby making confidential postcard samples. In opening the seal of the thus made samples each, each sample was peeled apart at the interface between the support and the release layer, in contrast to the samples prepared in Examples 1 to 3. The 180° peeling resistance between the support and the release layer was measured at a peeling speed of 500 mm/min. in an atmosphere of 20° C. and 65% RH. All the measurement values in this examination were within the range of 20 to 30 g/50 mm. On the other hand, the 180° peeling resistance between the ionomer resin layer and the heat-sensitive layer was greater than 300 g/50 mm. As to the seal-opening tests, satisfactory results were obtained in the postcards using the coated papers (1), (2) and (3) respectively. However, in the case of the postcard using the coated paper (4) having the lowest surface strength, opening failures occurred sometimes to result in exfoliation of the surface coating of the coated paper.

Evaluation results of the confidential postcards made in Examples 1 to 3 and Comparative Examples 1 and 2 respectively are shown in Table 1.

TABLE 1

| | 180° Peeling resistance g/50 mm | Success rate (%) in seal-opening | | | |
| --- | --- | --- | --- | --- | --- |
| | | Coated paper (1) | Coated paper (2) | Coated paper (3) | Coated paper (4) |
| Example 1 | 10–20 | 100 | 100 | 100 | 100 |
| Example 2 | 20–30 | 100 | 100 | 100 | 100 |
| Example 3 | 20–30 | 100 | 100 | 100 | 100 |
| Comparative Example 1 | 50–70 | 100 | 97 | 88 | 7 |
| Comparative Example 2 | 20–30 | 100 | 100 | 100 | 50 |

Additionally, the 180° peeling resistance value and the success rate of opening the seal were each evaluated as follows:

180° Peeling Resistance

Each of the confidential postcards was cut into slips measuring 50 mm×140 mm in size, and the peeling resistance thereof was measured at a peeling speed of 500 mm/min. in an atmosphere of 20° C. and 65% RH according to JIS Z-0237.

Success Rate (%) in Seal-Opening

The seal-opening test was carried out using 300 sheets of confidential postcard of each kind, and the success rate in opening the seal was calculated from the following equation:

Success rate (%) in seal-opening=(number of postcards peeled apart normally/number of postcards received peeling test)×100

As can be seen from Table 1, the present heat-sensitive adhesive sheets ensured highly consistent peeling strength at the interface between the release layer and the heat-sensitive adhesive layer, and so they were instrumental in bonding a pair of information-recorded faces of recording material together in a condition that the bonded faces can be peeled apart when desired. Further, the test results shown in Table 1 demonstrate that the present heat-sensitive adhesive sheets can be applied to recording materials weak in surface strength. Moreover, when the present information-recorded materials are made so as to have a postcard size, they can communicate at least twice as much information as a conventional postcard by the postage for a postcard, and can be a useful information-conveying means excellent in privacy protection.

What is claimed is:

1. A double-sided heat-sensitive adhesive sheet for bonding a pair of information-recorded faces of one or two sheets of recording material together by application of heat thereto, said adhesive sheet comprising:

a support provided with a release layer on one side thereof, and two heat-sensitive adhesive layers, one on the side of the support without the release layer and adhering to the support and, the other on the release layer such that the release layer and the heat-sensitive adhesive layer has at their interface a 180° peeling resistance of 10–30 g/50 mm in a peel test performed at a peeling speed of 500 mm/min. in an atmosphere of 20° C. and 65% RH.

2. A heat-sensitive adhesive sheet as described in claim 1, wherein said release layer comprises thermosetting resin.

3. A heat-sensitive adhesive sheet as described in claim 2, wherein said thermosetting resin is at least one resin selected from the group consisting of urethane resins, melamine resins, fluorocarbon resins, silicone resins, polyester resins and polyolefin resins.

4. An information-recorded sheet material comprising:

at least one heat-sensitive adhesive sheet of claim 1, which is interposed between at least one opposed pair of information-recorded faces of recording material wherein said adhesive sheet and said opposed information-recorded faces are bonded together by application of heat thereto to be integrated into a laminate.

5. An information-recorded sheet material comprising:

at least one heat-sensitive adhesive sheet of claim 2, which is interposed between at least one opposed pair of information-recorded faces of recording material, wherein said adhesive sheet and said opposed information-recorded faces are bonded together by application of heat thereto to be integrated into a laminate.

6. The information-recorded sheet material of claim 4, wherein the at least one opposed pair of information-recorded faces of recording material comprises a single sheet with two information-recorded portions which is folded once to provide the two information-recorded portions as the opposed pair of information-recorded faces.

7. The information-recorded sheet material of claim 4, wherein the material comprises two pairs of opposed pair of information-recorded faces of recording material, each pair being interposed by a heat-sensitive adhesive sheet.

8. The information-recorded sheet material of claim 7, wherein the two opposed pairs of information-recorded faces of recording material comprises a single sheet with four information-recorded portions which is folded twice in Z-form to provide the four information-recorded portions as two opposed pairs of information-recorded faces.

9. The double-sided heat-sensitive adhesive sheet of claim 1, wherein the support is a plastic film or paper sheet.

10. The double-sided heat-sensitive adhesive sheet of claim 1, wherein the support is a polyethylene terephthalate, polypropylene, polyethylene, polyvinyl chloride, polystyrene, polycarbonate or triacetate plastic film.

11. The double-sided heat-sensitive adhesive sheet of claim 1, wherein the support has a thickness of from 12 to 150 $\mu$m.

12. The double-sided heat-sensitive adhesive sheet of claim 1, wherein the release layer has a thickness of from 1 to 10 $\mu$m.

13. The double-sided heat-sensitive adhesive sheet of claim 1, wherein each heat-sensitive adhesive layer comprises at least one resin selected from the group consisting of ethylene/vinyl acetate copolymer resins, polyester resins, ethylene/acrylic acid copolymer resins and ethylene/ethyl acrylate copolymer resins.

14. The double-sided heat-sensitive adhesive sheet of claim 1, wherein each heat-sensitive adhesive layer has a matted surface provided by the addition of a pigment thereto.

15. The information-recorded sheet material of claim 4, wherein the recording material is of paper sheets having a surface strength of Dennison Wax No. 10 or below.

16. The information-recorded sheet material of claim 4, wherein information-recorded faces of the recording material contain printed information.

* * * * *